INVENTOR.
Emilio C. Garcia

INVENTOR.
Emilio C. Garcia

INVENTOR.
Emilio C. Garcia

INVENTOR.
Emilio C. Garcia

Feb. 3, 1970   E. C. GARCIA   3,492,964
APPARATUS AND METHOD FOR OCEAN PUSH-TOWING
Filed Aug. 22, 1968   8 Sheets-Sheet 8

INVENTOR.
Emilio C. Garcia

United States Patent Office
3,492,964
Patented Feb. 3, 1970

3,492,964
APPARATUS AND METHOD FOR OCEAN PUSH-TOWING
Emilio C. Garcia, 441 Gravier St.,
New Orleans, La. 70130
Filed Aug. 22, 1968, Ser. No. 754,558
Int. Cl. B63b 21/00; B63h 28/00
U.S. Cl. 114—235                                  6 Claims

ABSTRACT OF THE DISCLOSURE

In combination, a barge having a partially notched or recessed stern with a forwardly rising bottom ramp and a deck partially overhanging said recess, a pair of arms mounted on each side of said notch and extending aft, and a tug having wedgelike structures mounted on its deck abaft the beam and having a bow that fits into said notch between said ramp and overhanging deck, and with said arms engaging the said top wedgelike structures in an interlocking wedge relationship to jointly lock the tug rigidly fore and aft to said barge, whereby said tug and barge can be locked together to operate as one vessel and separated to operate as two vessels.

---

The invention relates generally to ocean going barges and tugs and more specifically to an apparatus and method for rigidly but separably joining a barge and a tug into a single pusher type seagoing unit.

It is old in the art for a barge to have a notched or recessed stern to engage the bow of a pusher tug in an articulated or hinged relationship. The barge and the tug are free to pitch and roll separately and this has proven to be a drawback rather than an advantage in ocean going tugs. The separate pitching and rolling of the barge and tug has been such as to render it inadvisable if not impossible to go on the ocean in any kind of bad weather or when there is a sea running. Parallel arms have also been used but they have been hinged to the rearer of the barge and amidships or forward thereof on the tug so that both vessels were free to pitch and roll separately in any sea and possible jack-knifing in 3-dimensions. Also the "Carport" designed by George G. Sharp in 1950 is old. In this arrangement a well extends the major part of the length of the towboat and affords complete bottom support, the center of gravity of the tug being within the horizontal projection of the bottom support. The surfaces of the barge well and the towboat hull have a close fit and the only possible motion of the two hulls respect to one another is in the fore and aft direction, which in turn is resisted with cables or turnbuckles. This connection allows a design in which the lines of the towboat match the lines of the barge and the combination of both has a relatively fair immersed body. However, due to the bottom support of the towboat in the well, the lines of the barge, principally the longitudinal vertical contours, have to be kept very low and close to the keel line, and as a consequence the lines of the stern part of the tug have to have fairly steep longitudinal vertical sections which is not a very efficient shape for the after body from a propulsion coefficient point of view. A further detriment is the uncertain uncoupling time. In one instance it took 12 hours to separate the tug and barge.

It is an object of the invention to provide apparatus and a method to quickly attach a pusher type seagoing tug to a barge so as to unite the two vessels in one rigid unit but, nevertheless, for them to retain their separate identities and to be separable at will.

It is also an object of the invention to arrange the tug with respect to the barge so that the body of the tug fairs with the body of the barge to improve the overall efficiency of propulsion about 20%.

Other objects and a fuller understanding of the invention may be had by referring to the following description and claims and the drawings in which:

Figure 1:
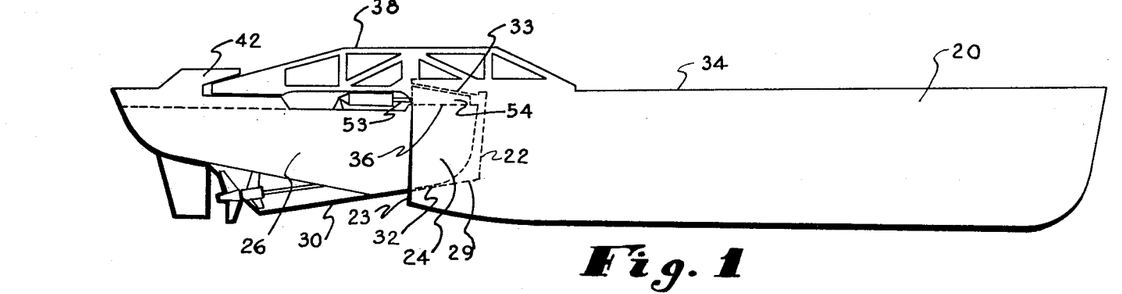
FIGURE 1 is a side elevation of the invention showing one species of structure and apparatus for forward and aft wedging.
Figure 2:
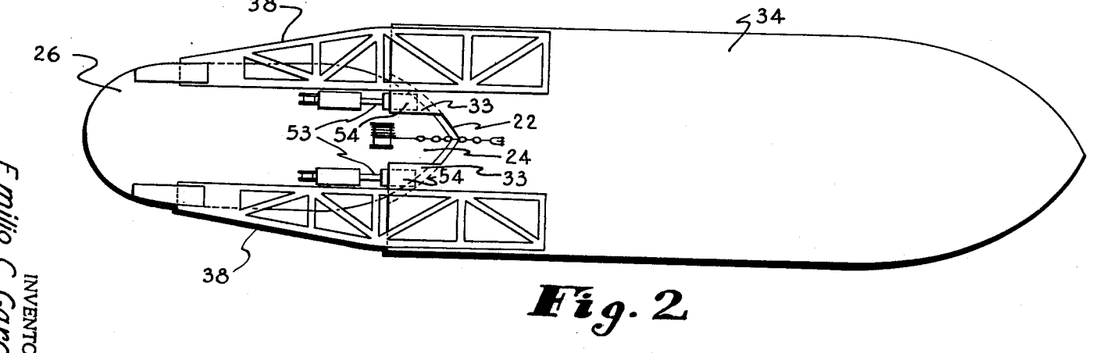
FIGURE 2 is a plan view of FIGURE 1 showing overhanging arms and deck.
Figure 7:
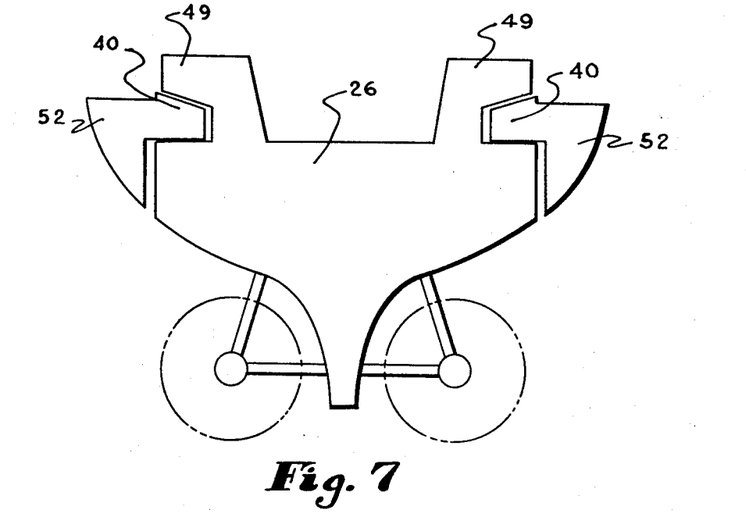
FIGURE 7 is similar to FIGURE 5 showing an alternative compound rear wedge.
Figure 8:
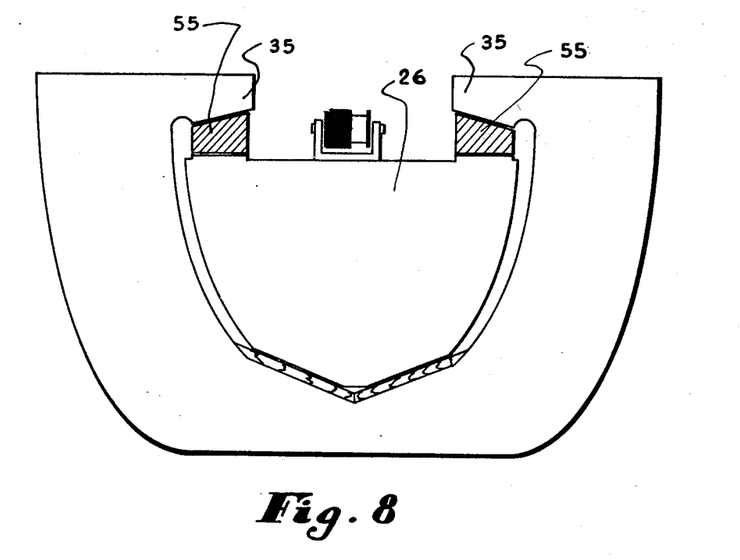
FIGURE 8 is similar to FIGURE 6 showing an alternative compound forward wedge.

Referring to FIGURES 1 and 2 the invention comprises a seagoing barge 20 having a notch or recess 22 in the stern 23 for the reception of the bow 24 of a seagoing pusher tug, 26. The bottom of the notch 22 defines a ramp 29 and is sloped upward and forward at approximately the same angle as the keel 30 makes with the horizontal in its floating position to engage the forward part 32 of the keel 30 of the tug. Also a section 33 or 35 of the barge deck 34 overhangs the notch so as to engage the top deck 36 in the bow of the tug in cooperation with alternative apparatus hereinafter described to hold the front end in rigid relationship with the barge. Two arms 38 are respectively mounted on each side of the notch 22 in the stern 23 of the barge. These arms extend aft in cantilever structures that are spaced apart to receive the tug 26 therebetween and terminate in simple wedges 42 (see FIGURES 5 and 6) that can be wedge-shaped longitudinally and compound wedges 40 that can be wedge-shaped longitudinally and transversely (see FIGURES 7 and 8). The tug 26 mounts hook structures 48 or 49 respectively outlining wedge orifices cooperatively shaped to respectively engage the wedges 42 or 40 of the rearward extending arms 38. The arrangement suspends the rear of the tug 26 on the arms 38 and in cooperation with the forward securing and wedging apparatus, rigidly holds the tug 26 inflexibly attached to the barge 20. Mating surfaces are of Monel or similar lubricated bearing material.

Figure 3:
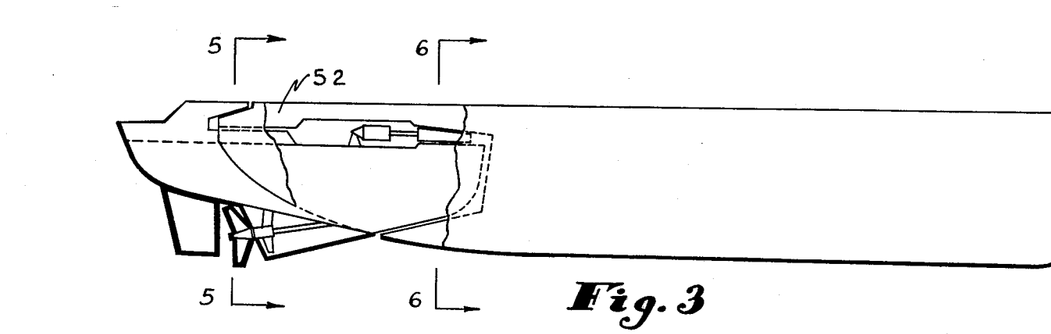
FIGURE 3 is a partially cutaway side elevation similar to FIGURE 1 showing a second species of structure and apparatus for fore and aft wedging.
Figure 4:
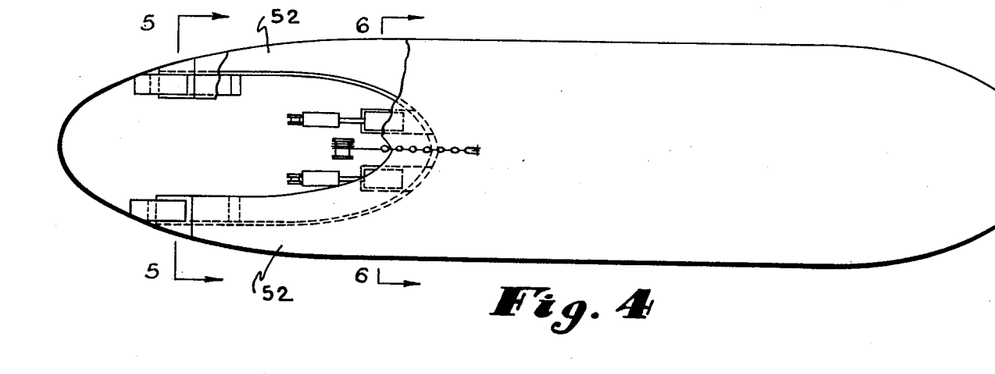
FIGURE 4 is a partially cutaway plan view of FIGURE 3.
Figure 5:
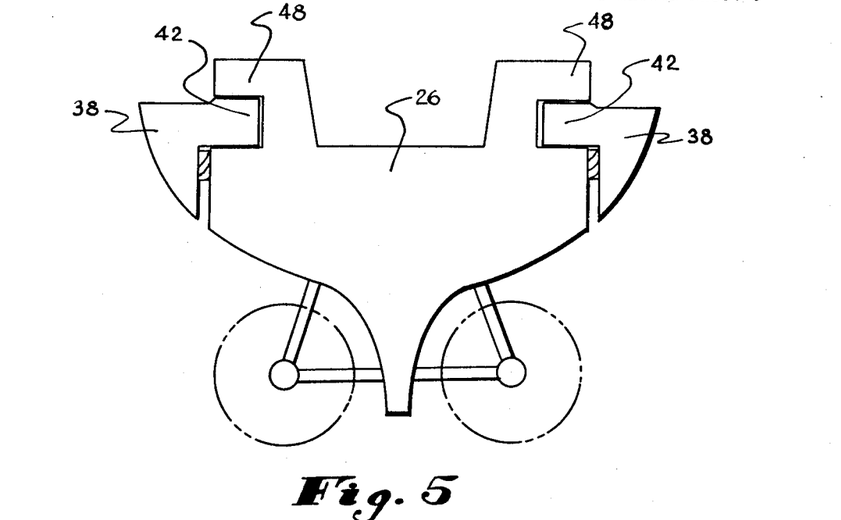
FIGURE 5 is a cross section of FIGURE 3 along section lines 5—5.
Figure 6:
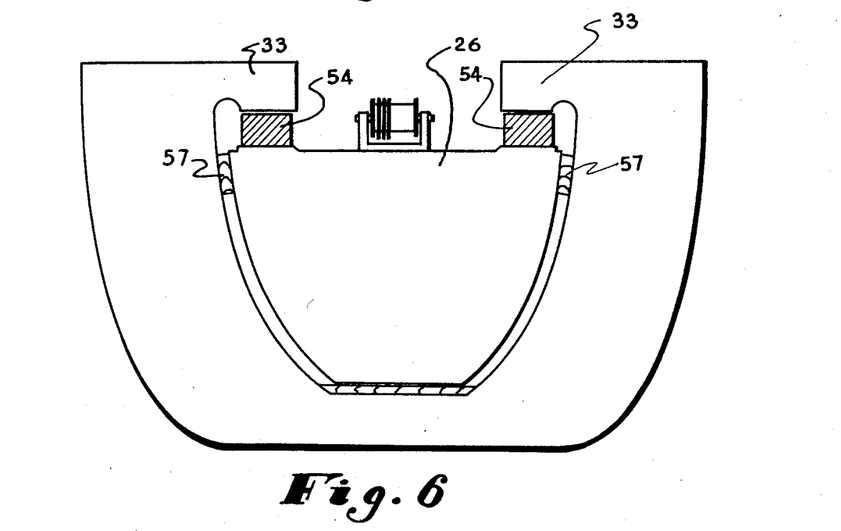
FIGURE 6 is a cross section of FIGURE 3 along section lines 6—6.

Also referring now to FIGURES 3 and 4 the different species have to do with the different placings of the arms 38 and 52 with respect to the barge, and different structure and placing of the wedging apparatus, both fore and aft. The arms 38 and 52 are arranged respectively above or flush with the deck of the barge. In the first alternative the arms 38 are welded components fixedly mounted and extending above and beyond the neck of the barge. In the second alternative the arms 52 are flush with the barge deck. Referring to FIGURES 5 and 6, the wedges and wedge-receiving hooks may be simple 42 or as in the FIGURES 7 and 8 compound 40.

Two arms 53 having wedge ends 54 are mounted on the bow 24 of the tug and said ends 54 are driven between the top deck 36 of the bow 24 of the tug and the partially overhanging barge deck 34 when the forward part 32 of the keel 33 is in the ramp 29 to jam vertically the tug deck 36 and forward keel part 32 in the notch 22. The arms 53 may carry compound wedge ends 35 (see FIGURE 8) to engage barge deck.

Figure 9:
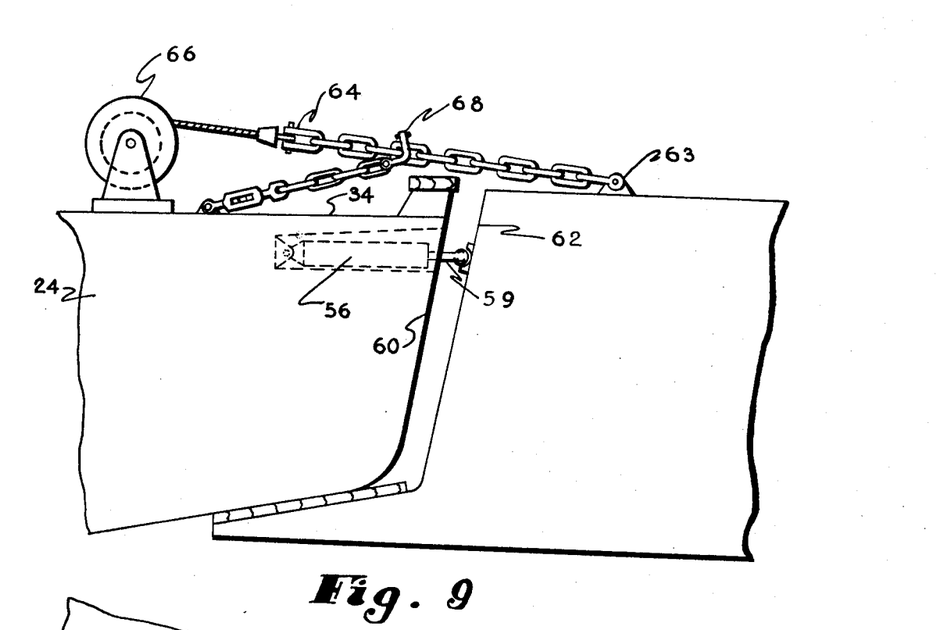
FIGURE 9 is an enlarged partial side elevation of forward securing and separation apparatus.
Figure 10:
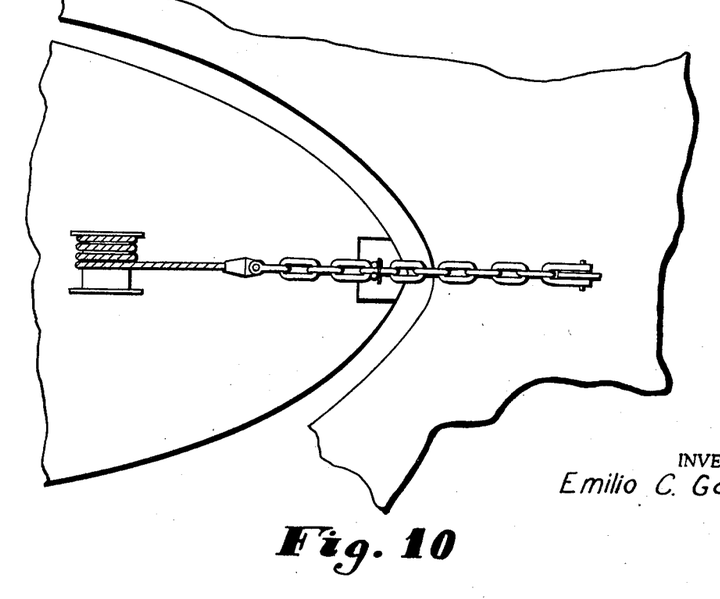
FIGURE 10 is a plan view of FIGURE 9.

To prevent lateral movement of the tug in the notch transverse chocks 57 are fitted port and starboard on the tug that are adjusted to bear on the side structure defining the notch. In addition, transverse movement is prevented by the fixed stern wedges on barge and wedge orifices on tug, their design having transverse slope as well as longitudinal slope similar to compound wedges 55 of FIGURE 8. Referring to FIGURE 9 a third ram 56 is mounted below deck on the tug and has its operation arm 59 extending through the prow 60 of the tug to push against the stern 62 of the barge to assist in separating the two vessels.

To prevent longitudinal movement of the tug in the notch the tug bow 24 is secured to the barge stern by chain or cable 64 on the anchor windlass 66 mounted on the bow deck 34 to a padeye 63 welded to the barge stern. The cable 64 and windlass 66 can be used to help pull the tug bow into the notch. A quick release locking chain and pelican hook 68 secures the chain and cable against inadvertent release of the windlass.

Figure 11:
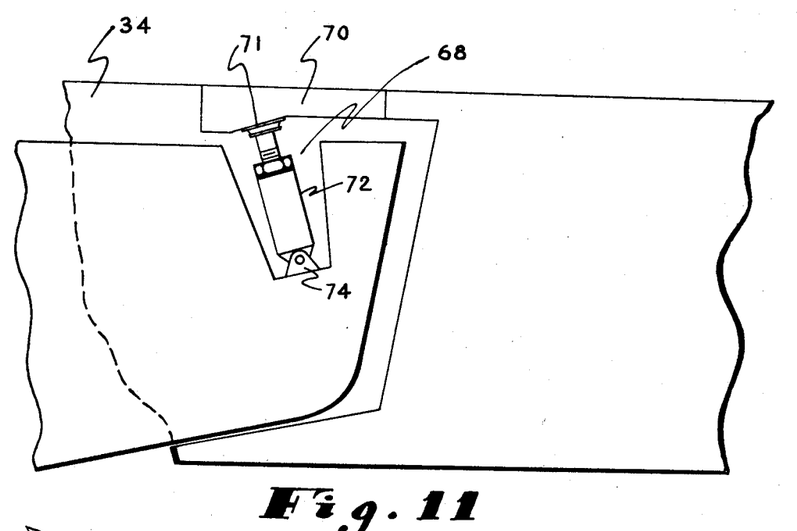
FIGURE 11 is similar to FIGURE 9 showing a combination forward securing and wedging apparatus.
Figure 12:
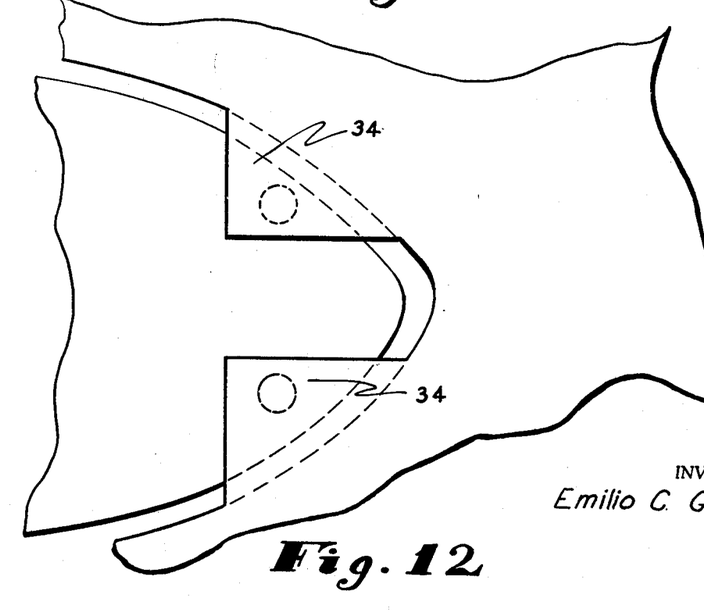
FIGURE 12 is a plan view of FIGURE 11.

Another method and apparatus for securing the tug bow in the notch to the barge stern is illustrated in FIGURES 11 and 12. The bow deck 34 of the tug defines an upward and rearward extending recess 68. The underside of the overhanging barge deck 34 mounts a horizontal strength member 70 having a rearward and downward portion 71. A jack 72 is mounted upright the recess on pivot mounting 74 to pivot fore and aft. With the tug bow engaged in the barge notch the jack is operated to engage the downward sloping portion 71 of the strength member 70 to wedge the bow in the notch.

Figure 13:
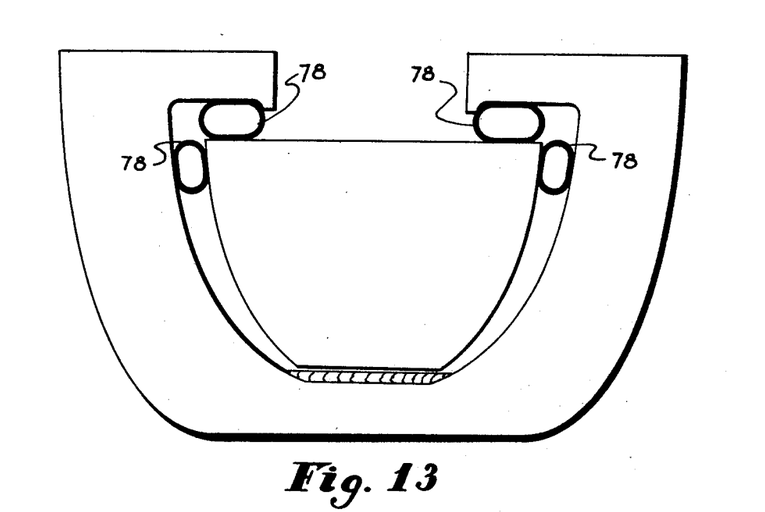
FIGURE 13 is similar to FIGURES 6 and 8 and shows another forward wedging apparatus.
Figure 14:
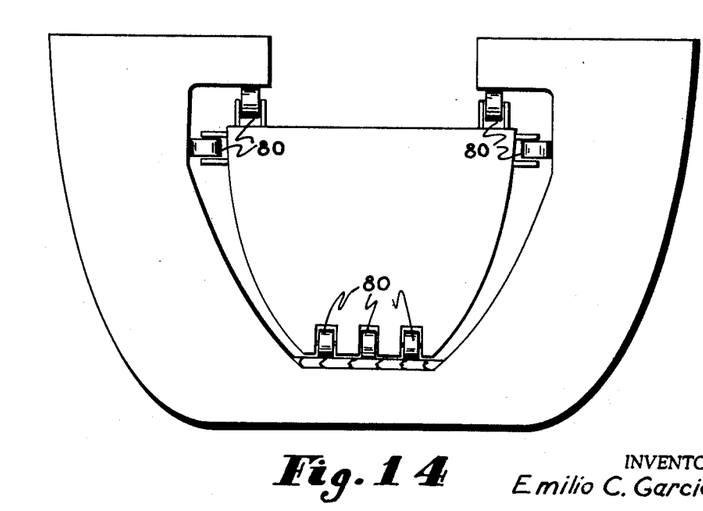
FIGURE 14 is similar to FIGURE 13 and shows still another forward wedging apparatus.

As illustrated in FIGURES 13 and 14 there are two additional methods of wedging the bow of the tug in the notch 1. In one, inflated bumpers or chocks 78 can be inserted between the opposing decks and sides of tug and barge. In the second, spring mounted rollers 80 are mounted on the deck, sides and bottom of the tug and engaging opposing bottom and sides of the notch of the barge.

Figure 15:
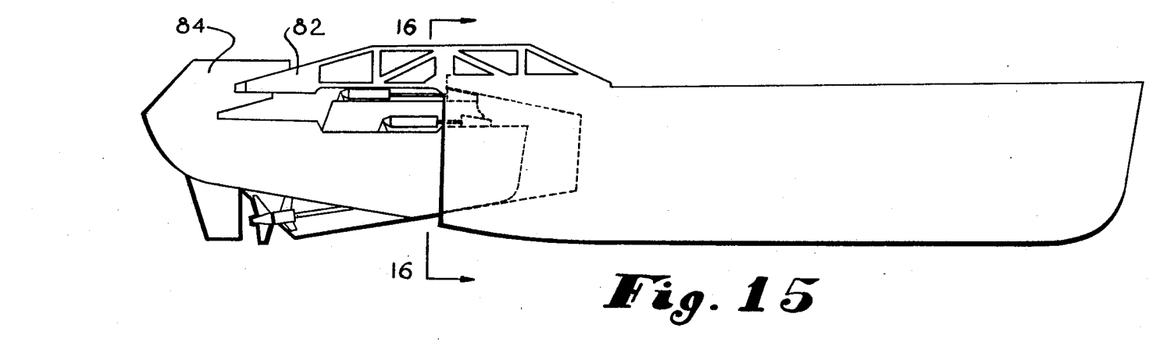
FIGURE 15 is a side elevation similar to FIGURE 1 showing wedge and double wedge-engaging structure for attaching the rear of the tug to the barge.
Figure 16:
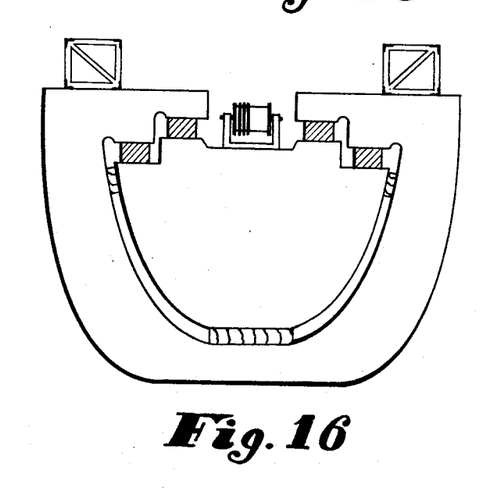
FIGURE 16 is a cross-section of FIGURE 15 along section lines 16—16.

Referring to FIGURES 15 and 16 wedges 82 engage in one of two or more possible vertically different combinations with deck double wedge recessing structure 84 to allow for different loadings of barge and tug and still cooperatively engage these parts to secure the tug stern to the barge. In the other methods and apparatus for rigidly attaching the tug to barge, ballast tanks are provided in the tug and barge having a capacity to vertically aling the hook structures of the tug with the wedges of the arm for their mutual cooperation and to retain the same independent drafts on each vessel during a voyage in order to obtain quick separation of the vessels in the event of an emergency.

In operation the tug is connected with a slight excess weight so that it has to climb the ramp in the well and in the aft wedges during the mating operation. The force to climb the ramp comes from a bow winch or windlass and can be propeller assisted. The line from the bow winch 66 connects to a short piece of chain attached to the barge. A pelican's hook 68 or other quick release mechanism is then attached to the chain to release the strain on the winch during the voyage. Sufficient ballast tanks are provided in the tug to keep a positive downward force in the connection during the trip and to adjust for changes of displacement of the barge in different loading conditions. For separation the adjustable bow chocks and wedges are withdrawn with hydraulic cylinders and the trigger mechanism of the chain connection is released. A backing force from the propellers plus the component of excess weight on the ramp will provide the necessary force and the bow winch will provide for a controlled separation. A towing line will be connected to the stern of the tug and to the bow of the barge in order to be able to continue towing the barge on the line after separation. Then the two faired wings projecting down from the protruding arms become the skegs for directional stability necessary for towing on the line. Separation of the vessels is accomplished by reversing the sequence.

Uncoupling of the vessels in an emergency at sea, probably in storm conditions may be accomplished in the same way. A hydraulic break away ram provided in bow of the tug will assist in the disconnection. Independent drafts of tug and barge should be approximately the same. The chain connection may be quickly released as can the forward wedges and transverse hydraulic chocks. The tug may then be quickly separated by astern thrust on the propellers and the action of the bow ram. The possibility of hull damage to either hulls is reduced due to the action of the spring loaded rollers acting as fenders. The disconnection can be made in approximately two minutes. A line attached to the chain connection may be retained between tug and barge after separation and the barge eventually taken in tow if prevailing conditions permit.

The invention has been described with a certain degree of particularity but it should be understood that at the present disclosure has been made only by way of example and that various changes could be made in combination and arrangement of parts without departing from the spirit and scope of the invention as here enacted.

What is claimed is:

1. In an ocean going combination of a barge having a partially notched stern with an ocean going tub having a bow for engaging in said notched stern; a pair of cantilever arms rigidly fixed on said barge and extending rearward from said notched stern and on each side of said notch, said arms terminating respectively in wedge ends; deck hook structures defining wedge shaped orifices cooperatively shaped to engage said wedge ends, mounted on the tub abaft its beam and center of gravity; means for rigidly holding said wedge ends in engagement in said wedge shaped orifices; a barge deck partially overhanging said notch and an opposing forwardly and upwardly slanting ramp for receiving the bow of said tug therebetween in said notch; means for rigidly wedging said bow in said notch against lateral and vertical movement; and tensioning means attached to said tug bow and barge stern for preventing longitudinal movement therebetween, whereby said tub and barge can be rigidly but separably joined to form a single seagoing unit.

2. An ocean pusher combination as described in claim 1 wherein said cantilever arms terminate respectively in compound wedges, that is wedges that are wedge shaped in two directions, longitudinally and transversely.

3. An ocean pusher combination as described in claim 1 wherein said cantilever arms terminate respectively in single wedges and said deck hook structures define double wedge shape orifices cooperatively shaped to engage said double ends in two positions vertically, to provide a means for allowing for differences of draft of the tug and barge.

4 Means for allowing for differences of draft as described in claim 3 wherein said means comprise ballast tanks in said tug and barge.

5. An ocean pusher as described in claim 1 wherein said tensioning means comprise a forward anchor windlass on the tug, a stern padeye on the barge, and a cable and chain therebetween, 6. The method of rigidly joining an ocean going tug to a barge having a notched stern therefor to form a unitary seagoing combination comprising the steps of: moving said tug, bow first, into said notch with the propeller, winch and cable; supporting the bow of the tug in its floating attitude on a forwardly rising ramp and under a partially overhanging deck that together define the bottom and top of said notched stern; suspending the after part of the tug on cantilever arms projecting from the stern of said barge; wedging said bow rigidly between said overhanging deck and said opposing ramp; wedging said tug against transverse movement in said notch and between said arms; holding said tug in said notch against longitudinal relative movement with said winch, cable and padeye, whereby said tug and barge are rigidly joined but separable by reversing said steps.

References Cited

FOREIGN PATENTS 1,285,359 1/1962 France.

TRYGVE M. BLIX, Primary Examiner